(12) United States Patent
Beaudonnet et al.

(10) Patent No.: US 10,532,530 B2
(45) Date of Patent: Jan. 14, 2020

(54) DEVICE AND METHOD FOR PRODUCING TIRES

(71) Applicants:COMPAGNIE GENERALE DES ETABLISSEMENTS MICHELIN, Clermont-Ferrand (FR); Michelin Recherche et Technique S.A., Granges-Paccot (CH)

(72) Inventors: Christian Beaudonnet, Ravel (FR); Michel Deboeuf, Clermont-Ferrand (FR); Philippe Bournerie, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 462 days.

(21) Appl. No.: 15/321,457

(22) PCT Filed: May 29, 2015

(86) PCT No.: PCT/EP2015/062026
§ 371 (c)(1),
(2) Date: Dec. 22, 2016

(87) PCT Pub. No.: WO2016/000879
PCT Pub. Date: Jan. 7, 2016

(65) Prior Publication Data
US 2017/0151741 A1 Jun. 1, 2017

(30) Foreign Application Priority Data
Jun. 30, 2014 (FR) ..................................... 14 56172

(51) Int. Cl.
*B29D 30/38* (2006.01)
*B29K 105/10* (2006.01)

(52) U.S. Cl.
CPC ........ *B29D 30/38* (2013.01); *B29D 2030/381* (2013.01); *B29K 2105/10* (2013.01)

(58) Field of Classification Search
None
See application file for complete search history.

(56) References Cited

U.S. PATENT DOCUMENTS 2,777,478 A * 1/1957 Stohlquist ................ B21F 1/04
    72/190
4,050,973 A 9/1977 Neville et al. ............ 156/123 R
(Continued)

FOREIGN PATENT DOCUMENTS

DE 199 01 958 A 8/2000
EP 1022118 A2 * 7/2000 ......... B29D 30/3028
(Continued)

OTHER PUBLICATIONS

EP1022118 translated to English through the auto-translate tool of ESpaceNet (Year: 2019).*
(Continued)

*Primary Examiner* — Michael H. Wilson
*Assistant Examiner* — Alexander D Booth
(74) *Attorney, Agent, or Firm* — Venable LLP

(57) ABSTRACT

A device, which converts a reinforcing strip from being flat to being undulating, includes a transporter that guides fingers along a closed circuit, with the fingers being able to bear against a first face of the strip; a support plate that rotates about a plate axis and that supports rollers having axes parallel to the plate axis, with the rollers being able to bear against a second face of the strip; and a synchronizer that synchronizes a rotation of the support plate and a forward motion of the transporter. The closed circuit has an intersecting portion at which the synchronizer allows the fingers and the rollers to move rotationally in a common plane (Continued)

perpendicular to the plate axis, with the fingers and the rollers being interposed at the intersecting portion so as to cause the strip to have undulating waves that extend in the common plane.

17 Claims, 4 Drawing Sheets

(56) References Cited

U.S. PATENT DOCUMENTS

| | | | |
|---|---|---|---|
| 4,094,354 A | 6/1978 | Ferrell et al. | 152/361 R |
| 5,002,621 A | 3/1991 | Ikeda | 156/177 |
| 5,009,732 A | 4/1991 | Ikeda et al. | 156/177 |
| 5,115,659 A | 5/1992 | Takami | 72/187 |
| 5,174,939 A | 12/1992 | Siegenthaler | 264/146 |
| 5,393,364 A | 2/1995 | Millier | 156/177 |
| 7,343,952 B2 | 3/2008 | Hinc | 156/397 |
| 2005/0115218 A1 | 6/2005 | Noferi | 57/311 |
| 2006/0191618 A1 | 8/2006 | Jault et al. | 152/526 |
| 2009/0084489 A1 | 4/2009 | Harikae et al. | 156/117 |
| 2011/0079343 A1 | 4/2011 | Ogawa | 156/117 |
| 2011/0167888 A1 | 7/2011 | Ogawa | 72/176 |
| 2015/0068656 A1 | 3/2015 | Hinc et al. | 152/537 |
| 2017/0157873 A1 | 6/2017 | Hinc et al. | |

FOREIGN PATENT DOCUMENTS

| | | |
|---|---|---|
| FR | 1 508 652 A | 1/1968 |
| GB | 1368609 * | 10/1974 |
| JP | H10-25680 A | 1/1998 |
| JP | 2006-334643 A | 12/2006 |

OTHER PUBLICATIONS

JP2006334643 translated to English through the auto-translate tool of ESpaceNet (Year: 2019).*

JPH1025680 translated to English through the auto-translate tool of ESpaceNet (Year: 2019).*

English translation of [0007] from EP1022118 as translated by internal USPTO staff (Year: 2019).*

Chain Driven Belt Conveyors, Central Converyors, Captured Mar. 8, 2013 through Internet Archive's Wayback Machine. https://web.archive.org/web/20130308100342/https://www.central-conveyors.co.uk/conveyors/chain-driven-belt-conveyors/ (Year: 2013).*

Jul. 27, 2015 International Search Report and Written Opinion in International Patent Appln. No. PCT/EP2015/062026.

International Search Report issued by WIPO dated Jul. 27, 2015, in connection with International Application No. PCT/EP2015/062026 (with English translation attached).

H. Hinc, U.S. Appl. No. 15/321,496, filed May 29, 2015.

* cited by examiner

DEVICE AND METHOD FOR PRODUCING TIRES

FIELD OF THE INVENTION

The invention concerns the field of manufacturing tires for passenger vehicles or utility vehicles and relates more particularly to assembly methods for successively laying all of the component parts of such a tire without substantial variation in the laying diameter.

RELATED ART

In these types of method, all of the operations for building the tire blank are carried out on a drum, the diameter of which preferably corresponds substantially to the inside diameter of the tire (commonly referred to as "rim seat diameter" with reference to the standard diameter of the rim on which the tire will be mounted during its use). Thus, not only the carcass, the beads and the sidewalls, but also the crown reinforcements and the tread can be laid on an assembly drum, the diameter of which corresponds substantially to the rim seat diameter. One advantage of these types of method is that they can make it possible to keep the tire blank on the same drum throughout its building. The complete blank can then be introduced directly into a vulcanizing mould, where it takes on its final diameter through the action of an internal pressure. An example of this type of method is given in the document FR1508652.

Shaping is the name given to the conversion undergone by the tire blank when it passes from its substantially tubular shape to the generally toroidal shape of a finished tire. During shaping, the central part of the blank, which corresponds to the crown of the tire, has its diameter increased through the action of an internal pressure, while the beads are kept at the initial diameter. The difference in circumference between the rim seat diameter and the shaped diameter is generally between 30% and 70% and, for example, commonly around 50% for a tire for a passenger vehicle.

One limitation of these methods comes from the fact that the crown reinforcements of tires for passenger vehicles or utility vehicles virtually systematically have circumferential hooping reinforcers, often known as "0° reinforcers". The function of these 0° reinforcers is to strongly curb the circumferential expansion of the tire while it is being used, notably at high speed. The term 0° reinforcers is used even when they are laid in a helically wound manner and thus with a very slight helix angle. This helix angle is generally ignored and the effect of the hooping reinforcers is considered to be the same as if they were disposed in a plane strictly parallel to the equatorial plane of the tire. It will be understood that if they were laid on the blank prior to the shaping of the latter, these 0° reinforcers would prevent shaping.

Solutions to this impossibility are proposed for example in the documents U.S. Pat. Nos. 4,050,973 and 4,094,354.

The document U.S. Pat. No. 4,050,973 proposes that the 0° reinforcers be prepared and laid on the tire blank in an undulating form obtained by knitting the 0° reinforcers with threads that are shorter but fragile, these threads being broken during shaping. One problem with this method is clearly the complexity and slowness of preparing the knit. Another problem is the fact that additional threads are required, which are useless in the final product and which can also be harmful.

The document U.S. Pat. No. 4,094,354 proposes that the 0° reinforcers be prepared in the form of a double strip of rubber comprising both undulating 0° reinforcers and threads that are taut but fragile and are intended to be broken during shaping. One problem with this method is clearly the complexity of preparing the double strip and also the fact that useless or even harmful threads are introduced into the final product.

Thus, in spite of these propositions, the tire industry has not adopted this type of method for assembling the entire blank at the rim seat diameter in order to manufacture tires having 0° crown reinforcers and in particular in order to manufacture modern radial tires.

BRIEF DESCRIPTION OF EMBODIMENTS OF THE INVENTION

Therefore, the object of the invention is to overcome at least one of the disadvantages described above.

To this end, the invention proposes a device for preparing and laying a strip comprising longitudinal reinforcers, said strip being laid in an undulating form such that the length of the longitudinal reinforcers is very much greater than the laying length. The term "overlength" is used to denote the difference between the strip length effectively laid and the length that is travelled over the laying surface.

In the present application, the term "reinforcing strip" or "strip" denotes a narrow band of rubber including longitudinal reinforcers that is intended to be laid by being wound helically within the blank of a tire. The reinforcers can for example be cords or monofilaments that are made of steel, of an inorganic material (glass fibre or carbon fibre), of synthetic fibre or of textile material in a manner known per se in the field of tires. A strip comprises a plurality of reinforcers, for example between 3 and 10 reinforcers. Such a strip has a maximum width of around 15 to 20 mm across the total width of the hoop reinforcement. Also preferably, for the hoop reinforcement of a passenger vehicle tire, the strip has a maximum width of 11 mm. The winding comprises a plurality of turns, for example between 10 and 30 turns in order to form a complete hoop reinforcement.

For that, the invention proposes a device for preparing a reinforcing strip intended for the manufacture of a tire, the said device making it possible to prepare an undulating reinforcing strip from a flat reinforcing strip, the said device comprising:
  a continuous transporter that is able to guide a plurality of fingers along a closed circuit comprising at least one rectilinear path portion, said fingers being able to bear against a first face of the strip,
  a rotary support plate that rotates about a support plate axis, said rotary support plate bearing a plurality of rotary rollers having axes parallel to the support plate axis, said rollers being distributed in a circle substantially concentric with the support plate axis, said rollers being able to bear against a second face of the strip,
  guide means for guiding the flat reinforcing strip entering the device,
  means for synchronizing the rotation of the rotary support plate and the forward motion of the continuous transporter,
in which the closed circuit has an intersecting portion in which the synchronizing means allow the fingers and the rollers to move in rotational movements in a common plane perpendicular to the support plate axis, the fingers and the rollers being interposed in said intersecting portion so as to impose waves on the strip that extend in said common plane.

Preferably, the continuous transporter is a chain guided by an intersecting sprocket in the intersecting portion of the closed circuit.

Also preferably, the rollers are distributed in a circle, the diameter of which is greater than the diameter of the intersecting sprocket.

Also preferably, the fingers are carried by the pins of the links of the chain.

Also preferably, the device also comprises a static strip diverter positioned in the intersecting portion in order to be able to divert the strip from the fingers, preferably at least a quarter turn after the start of the intersecting portion.

Also preferably, the guide means comprise pulleys able to guide the strip towards the intersecting portion in a direction close to the said common plane.

Also preferably, the transporter and the support plate are borne by a base that is able to move with respect to a fixed structure.

Also preferably, the device also comprises stitching means for stitching the undulating strip.

Also preferably, the device also comprises a winch that is able to control the supply with flat strip.

The invention also relates to an installation comprising such a device and further comprising a rotary receiving form placed facing the intersecting portion so that the peaks of the waves of the undulating strip can adhere to the surface of the form so as to allow the undulating strip to be transferred onto the form.

The invention also relates to a method for preparing an undulating strip using this installation.

Preferably, the receiving form consists of a green tire blank carried by a drum.

Also preferably, a plurality of terms of the undulating strip are wound in a helix onto the green tire blank, the waves of the strip extending in a plane substantially parallel to an equatorial plane of the green tire blank.

Also preferably, the height of the waves is varied during the process of winding onto the blank.

Also preferably, the waves of the strip are folded down against the green tire blank using stitching means.

BRIEF DESCRIPTION OF THE DRAWINGS

The following description makes it possible to more easily understand the structure and operation of a device according to the invention according to preferred embodiments and on the basis of FIGS. 1 to 9, in which.

DETAILED DESCRIPTION OF EMBODIMENTS OF THE INVENTION

In the different figures, identical or similar elements bear the same references. Therefore, the description of the structure and the function of these identical or similar elements is not repeated systematically.

Figure 1:
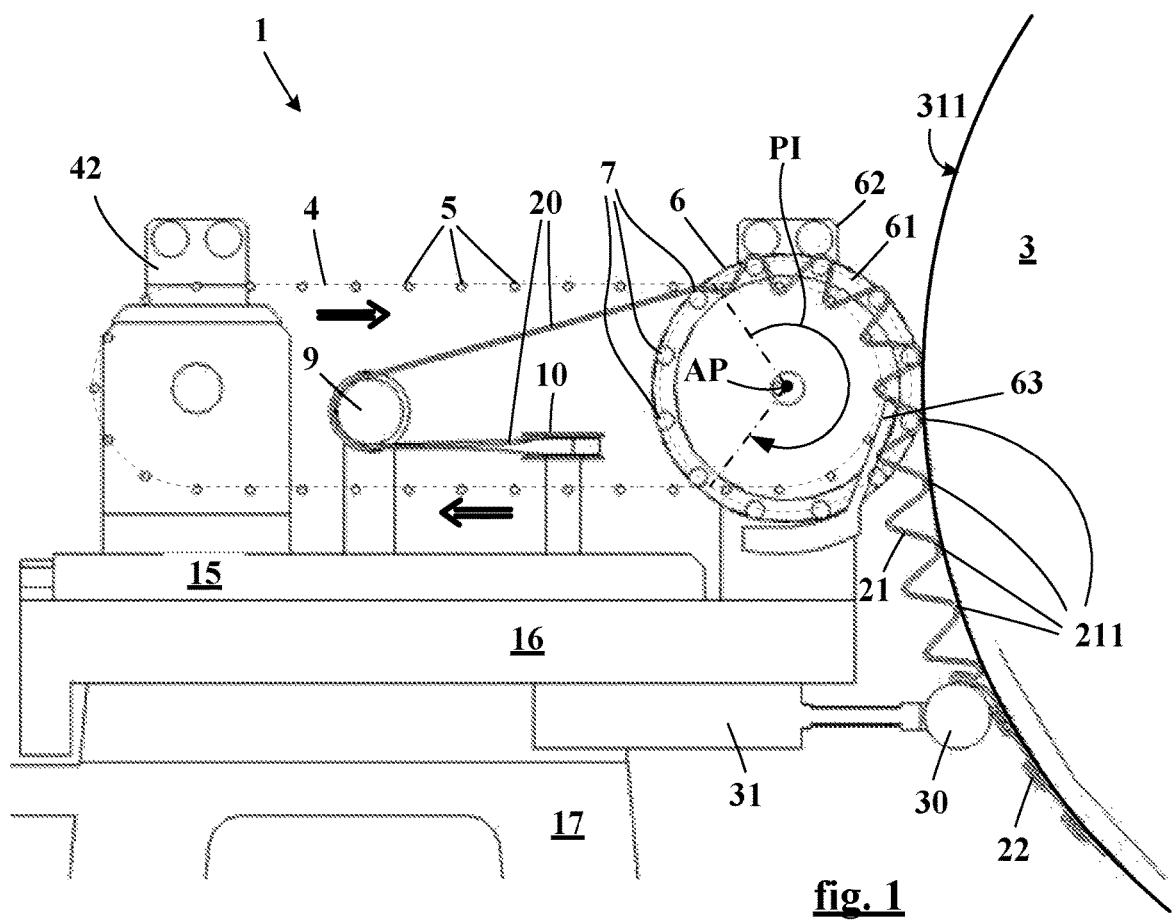
FIG. 1 is a schematic view showing a first embodiment of a device according to the invention during the use thereof.

The essential principles of the device 1 according to the invention can be seen in FIG. 1. This device makes it possible to convert a flat reinforcing strip 20 into an undulating strip 21. Preferably, the device also makes it possible to convert the undulating strip 21 into a stitched undulating strip 22, that is to say a strip, the waves of which have been folded down onto a receiving form (here a rotary form 3). It can be clearly seen in this figure that the length of the strip laid down on the form (and therefore the length of the longitudinal reinforcements that it contains) is significantly greater than the laying length travelled on the receiving form.

To this end, the device 1 comprises a closed circuit along which fingers 5 circulate in the direction indicated in the figure by the arrows. The fingers are guided along the circuit by an indexed continuous transporter 4, for example a chain or toothed belt. The continuous transporter is driven in this case by a geared transporter motor 42. A rotary support plate 6 carries rollers 7 that are distributed at its periphery in a circle 61 concentric with the axis of rotation AP of the rotary support plate. The rotation of the support plate is controlled by a geared support plate motor 62.

Synchronization means control the speed of the two geared motors such that the movement of the fingers 5 along the circuit is coordinated with the movement of the rollers 7 of the support plate, in particular in an intersecting portion PI in which the fingers and the rollers can thus move in a common plane perpendicular to the support plate axis AP. The fingers 5 bear against the upper face of the strip, while the rollers 7 bear against the lower face of the strip. During operation of the device, it will be understood that the rollers of the support plate are interposed between the fingers and progressively force the strip to take on an undulating shape 21.

The device 1 may, as depicted here, be associated with a rotary form 3. The device is then positioned facing the rotary form such that the rollers of the rotary support plate move, one after the other, towards the surface 311 of the form. The operation of the above-described device is synchronized with the rotation of the form. The peaks 211 of the waves of the undulating band 21 can then come into contact and be pressed, one by one, against the surface of the form. The rubber strip can thus adhere to points of the surface of the rotary form and then be carried along thereby.

The device preferably comprises a fixed strip diverter 63, the function of which is to axially release the strip 21 from the fingers once the undulating strip is connected to the form. The strip is then carried along by the rotary form and is released from the control of the fingers and the rollers of the device. The strip diverter 63 acts in the intersecting portion PI, preferably at least a quarter turn after the start of the latter.

Also preferably, stitching means 30 fold down the waves of the undulating strip 21 by pressing them against the surface of the form. The stitched undulating strip 22 is then, better still, fixed in terms of its position and in terms of the longitudinal orientation of its reinforcers, thereby making it possible to ensure the best distribution of the overlength of the reinforcers on the circumference of the form.

Figure 2:
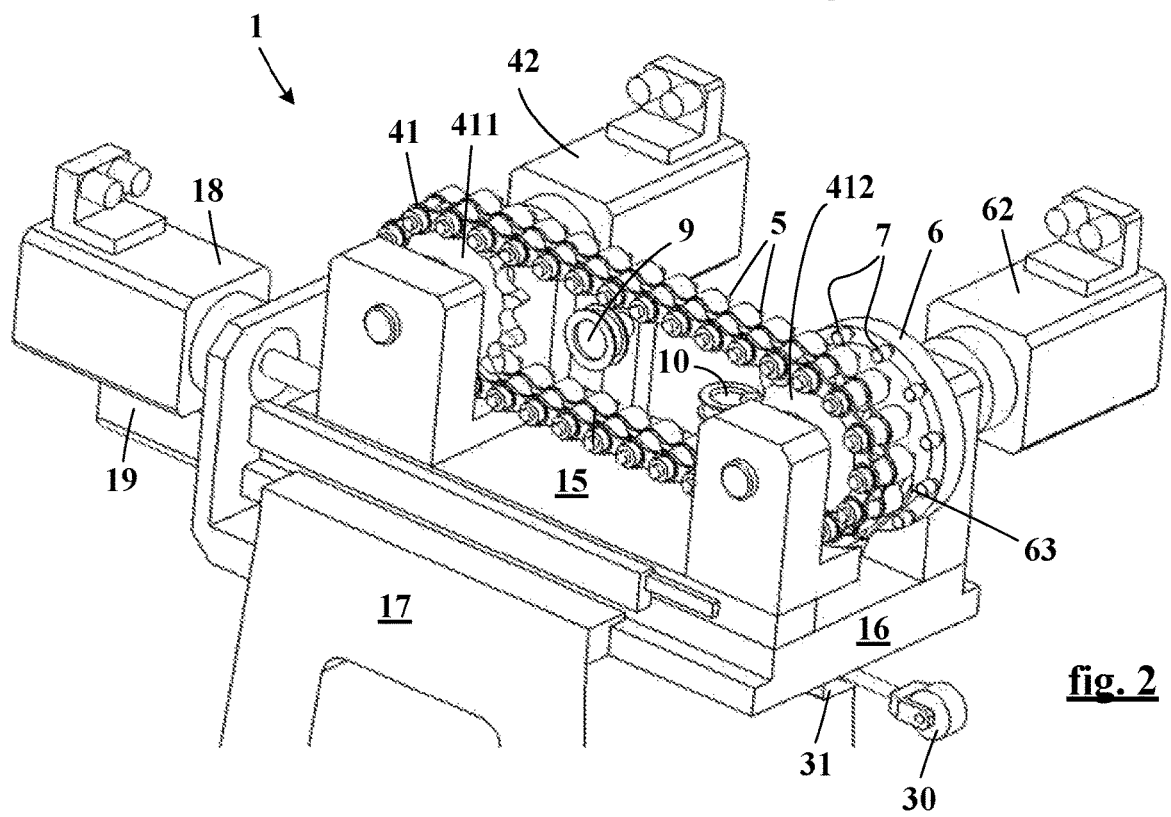
FIG. 2 is a schematic perspective view of the device from FIG. 1.

FIG. 2, in perspective, makes it possible to better see the constituent elements of this preferred embodiment of the device. In particular, if FIGS. 1 and 2 are compared, it is easy to see the principle of the means which guide the flat strip entering the device. A guide pulley 9 positioned in the plane and inside the closed circuit of the transporter 4 guides the flat strip towards the intersecting portion PI of the fingers and the rollers. The guide pulley 9 receives the strip from a feed pulley 10 that is also positioned in the plane of the circuit of the fingers but oriented so as to receive the strip from the outside, for example from the rear in FIG. 1 in this embodiment. It is also possible to see that the strip 20 is twisted by around a quarter turn between the two pulleys.

FIG. 2 also clearly shows the driving principle of the fingers 5 by the continuous transporter 4, in this case in the form of a chain 41. The chain 41 circulates about two sprockets 411 and 412. Consequently, the closed circuit of the transporter 4 comprises two semicircular path portions about the two sprockets 411 and 412 and two rectilinear path portions between the two sprockets 411 and 412. The drive sprocket 411 is driven by the transporter motor 42. Advantageously, the design of the continuous transporter 4 with chains 41 and sprockets 411 and 412 makes it possible to relocate the transporter motor 42 with respect to the geared support plate motor 62. The intersecting sprocket 412 is driven in rotation by the chain and its only function is to guide the chain and thus to guide the fingers 5 with respect to the rollers 7 of the support plate 6. As discussed above, the movement of the chain should take place in a manner perfectly synchronized with the rotation of the support plate 6 bearing the rollers 7. This synchronization is ensured by the synchronizing means, for example by common control of the two electric motors 42 and 62. Alternatively, the intersecting sprocket 412 can be driven in rotation by the same motor as the rotary support plate. Since the sprocket 412 is not necessarily coaxial with the support plate axis, it can preferably be driven by way of an Oldham coupling or a shaft equipped with constant-velocity joints.

Thus, in the intersecting portion PI, the continuous transporter 4 affords a first rectilinear path portion within which the fingers 5 move in a rectilinear manner while the rollers 7 of the support plate 6 are interposed between these fingers 5, and then a semicircular path portion within which the fingers 5 move in a circular manner inside the circle 61 around which the rollers 7 move, and then a rectilinear path portion again, within which the fingers 5 move in a rectilinear manner while the rollers 7 of the support plate 6 cross these fingers 5 again.

FIG. 2 also shows that a base 16 that is able to move with respect to a frame 17 makes it possible to control the position of the set of elements of the device relative to the receiving form and thus to the blank and also makes it possible to control the pressure with which the undulating strip 21 is pressed against the surface of the blank by the rollers. The stitching means, in this case in the form of a pressing roller 30, is also carried by the movable base 16, for example by way of a pneumatic cylinder 31 (see also FIG. 1) that impresses an elastic pressing force thereon. The position of the movable base 16 is in this case controlled by an electric cylinder 19.

A slide 15, which is itself able to move with respect to the base 16, supports the two sprockets of the continuous transporter. It will be understood that, by slightly moving this slide with respect to the holder of the rotary support plate (and thus with respect to the support plate axis AP), it is possible to vary the height of the waves imposed on the strip. In this way, it is possible to precisely vary the overlength given to the undulating strip. The movement of the slide 15 is in this case controlled by an electric slide cylinder 18. In order to give an indication of the order of magnitude, it is possible to say that an overlength of 50% is obtained when the waves have a height (amplitude) of around 11 mm.

Figure 3:
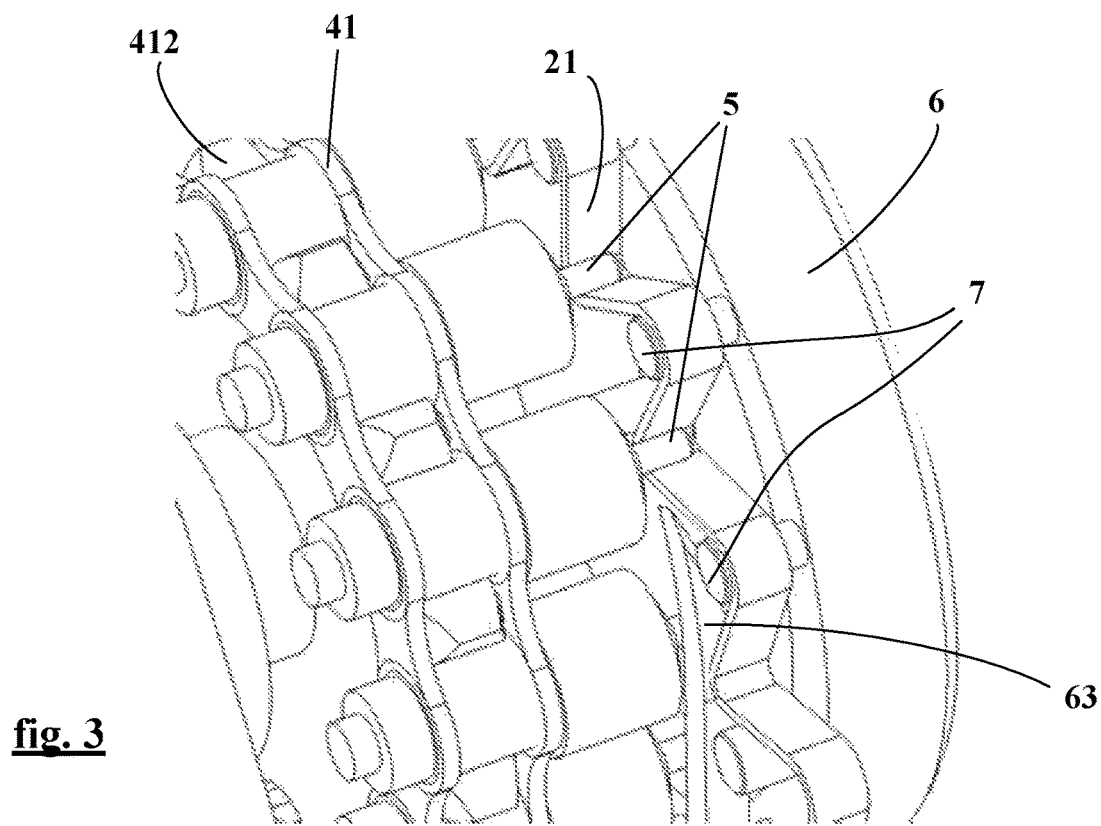
FIG. 3 is a detail view of the operation of the device from FIG. 1.

FIG. 3 shows, on a larger scale, the principle of the invention relating to the formation of the waves by the cooperation of the fingers 5 and the rollers 7 in the intersecting portion. It also clearly shows the principle of the strip diverter 63 (in the form of a static cam) the function of which is to divert the strip in order to release it from the finger 5 after it has been pressed against the form (not shown here). To this end, the strip diverter comprises an inclined plane along which the edge of the undulating strip 21 slides. It will be understood that at this stage, the strip is already joined to the receiving form.

Figure 4:
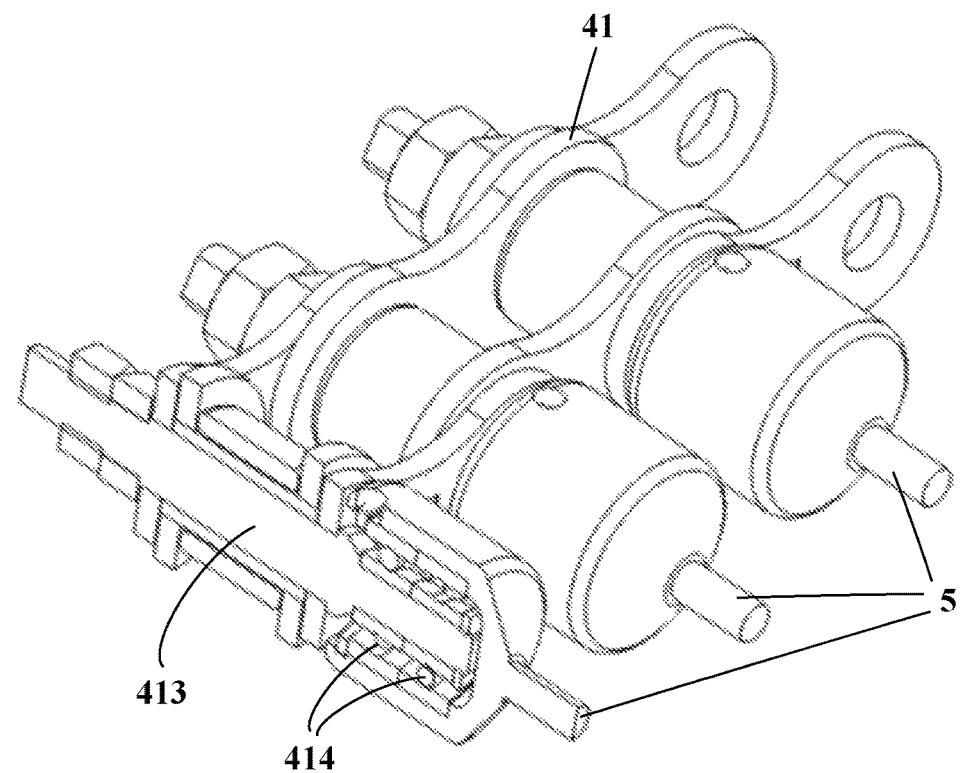
FIG. 4 is a cross-sectional view of an exemplary embodiment of the support for the fingers of the device from FIG. 1.

FIG. 4 shows, on an even larger scale, a detail of this embodiment of the invention and particularly of an embodiment of the continuous transporter and the fingers. The pins 413 of the links of the chain 41 support the fingers 5 that are mounted in rotation on said pins by way of ball bearings 414. The fingers 5 are thus free to turn with respect to their supports in order to allow the strip to circulate so as to form its waves by imposing as few forces as possible on the device (and on the strip itself).

Figure 5:
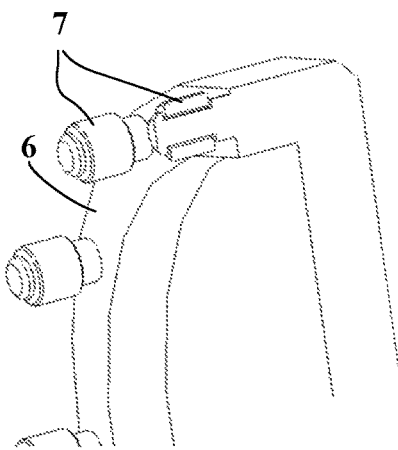
FIG. 5 is a cross-sectional view of an exemplary embodiment of the support for the rollers on the rotary support plate of the device from FIG. 1, FIGS. 6 and 7 are schematic perspective views showing two similar examples of a tire blank obtained by the method of the invention using a device according to the preceding figures.

FIG. 5 shows, on a large scale, a detail of this embodiment of the invention and particularly of the rollers 7 carried by the rotary support plate 6. The rollers are mounted so as to rotate on the support plate by way of bearings (for example plain bearings). Like the fingers, the rollers are free to turn with respect to their supports in order to allow the strip to circulate so as to form its waves by imposing as few forces as possible on the device (and on the strip itself).

The device of the invention therefore makes it possible to implement a method according to the invention that consists in preparing and laying on the receiving form an undulating strip comprising a controlled overlength. These two steps are performed in succession and continuously and preferably in close proximity to one another. The undulating strip is carried along by the receiving form. The undulating strip can be stored in reels and constitute a semifinished product intended to be used in the subsequent manufacture of a tire.

Preferably, however, the method of the invention consists in applying the strip directly to the green blank of a tire as it is being built. By comparison with the method that consists in preparing a semifinished product, direct laying on the blank makes it possible to better ensure the precision of laying, in particular as far as the value of the overlength of the reinforcers and the regular distribution of this overlength on the circumference of the blank are concerned. In this case, the receiving form is therefore made up of a green tire blank carried by a drum and around which a suitable number of turns of the undulating strip are wound in a helix in order to form the hoop reinforcement of the tire. This winding can be carried out at the rim seat diameter as described above in the preamble of the application, since the overlength of the reinforcers of the undulating strip then allows the blank to be shaped, that is to say to take the virtually final shape of a tire, before said 0° reinforcers are actually put under tension.

During the helical winding about the blank, it is also possible to vary the value of the overlength of the strip by virtue of the position of the slide 15 being controlled. It is possible for example to provide for the overlength to be less at the centre than at the shoulders of the tread, such that a certain curvature is given to the tire during the shaping of the complete blank.

Figure 6:
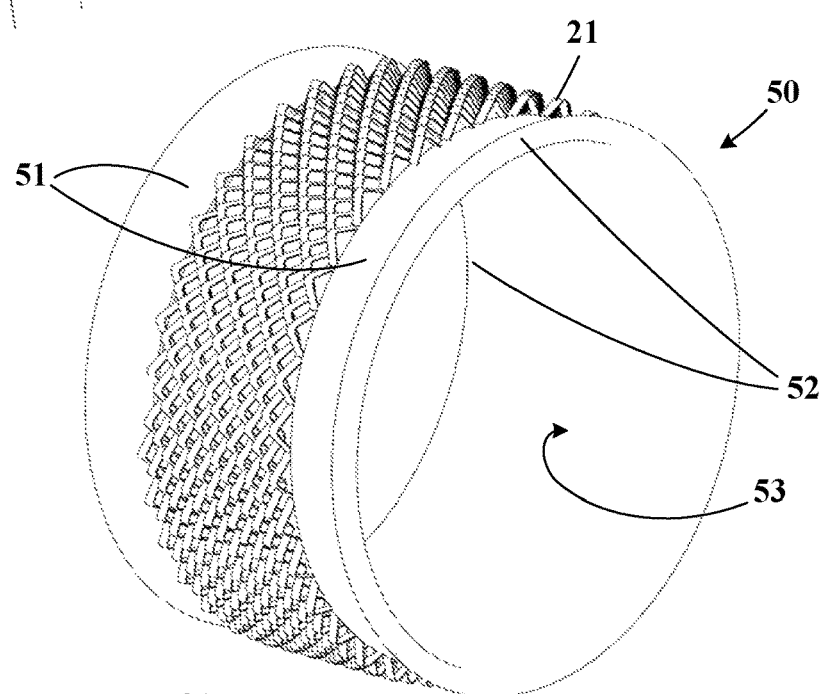

FIG. 6 schematically shows an example of this application of the invention to the building of a hoop reinforcement directly within a green blank of a tire 50. It is therefore this green blank that acted as a receiving form for the undulating strip prepared by the device of the invention. The 0° reinforcers disposed in the form of an undulating strip 21 as formed by the device of the invention can be seen. The waves of the strip extend in a plane parallel to the equatorial plane of the blank (ignoring the helix angle of the winding as discussed above). Around 15 turns have been wound around the blank in order to form the complete hoop reinforcement.

The layer containing the carcass reinforcers 51 and the beads 52 containing the bead reinforcers (often referred to as "bead wires") can also be seen. Crown reinforcer plies can be placed under the hoop reinforcement. An innerliner layer 53 is preferably present inside the carcass 51. The 0° reinforcer strips are shown here in the undulating form 21 but not stitched (referenced 22 in the above figures) in order to make it easier to read the drawing. It will be understood that the stitched form can be preferred in order to improve the precision of positioning the reinforcers in the rest of the method as described above. A tread and sidewall protection rubbers can also be added to this blank. All the constituents of the future tire can thus be laid at the same reduced diameter, that is to say on one and the same drum at the rim seat diameter and thus without intermediate shaping.

Figure 7:
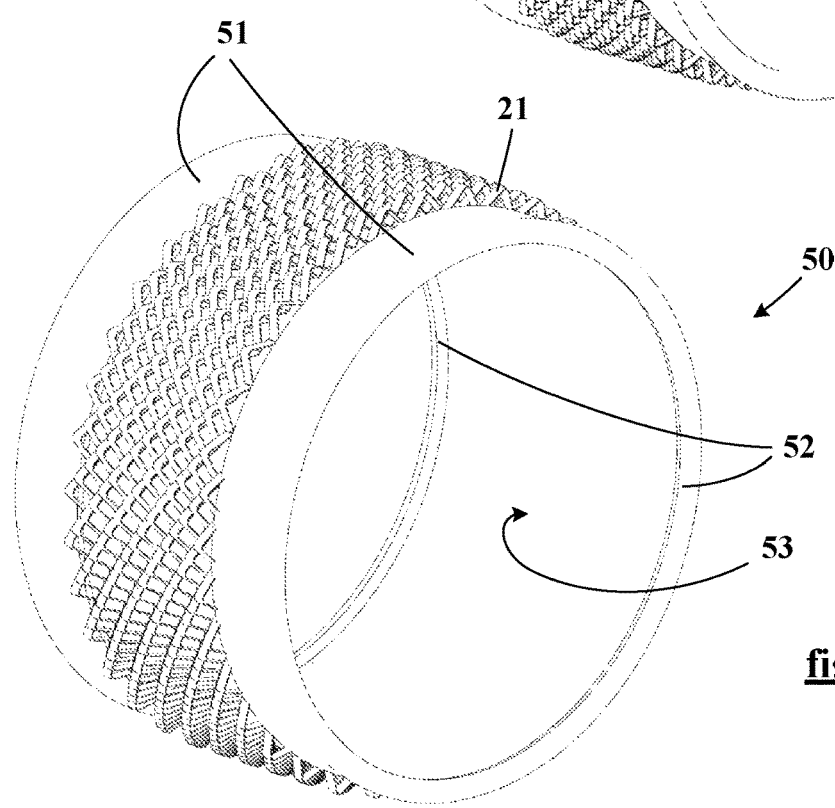

Alternatively, the laying drum can also have a diameter slightly greater than the rim seat diameter, if it comprises grooves for receiving the beads of the blank. A blank as shown in FIG. 7 is then obtained, instead.

In both cases, the assembly thus formed can then be placed in a vulcanizing press, shaped and then moulded and vulcanized in a manner known per se.

In order to give the entire winding uniform stiffness, provision may be made for the first and the last turn of strip to be wound without axial displacement and thus on itself. Likewise, in order to obtain a sufficient reinforcer density, it may be preferable to successively wind a plurality of hoop reinforcement layers according to the principle of the invention.

Figure 8:
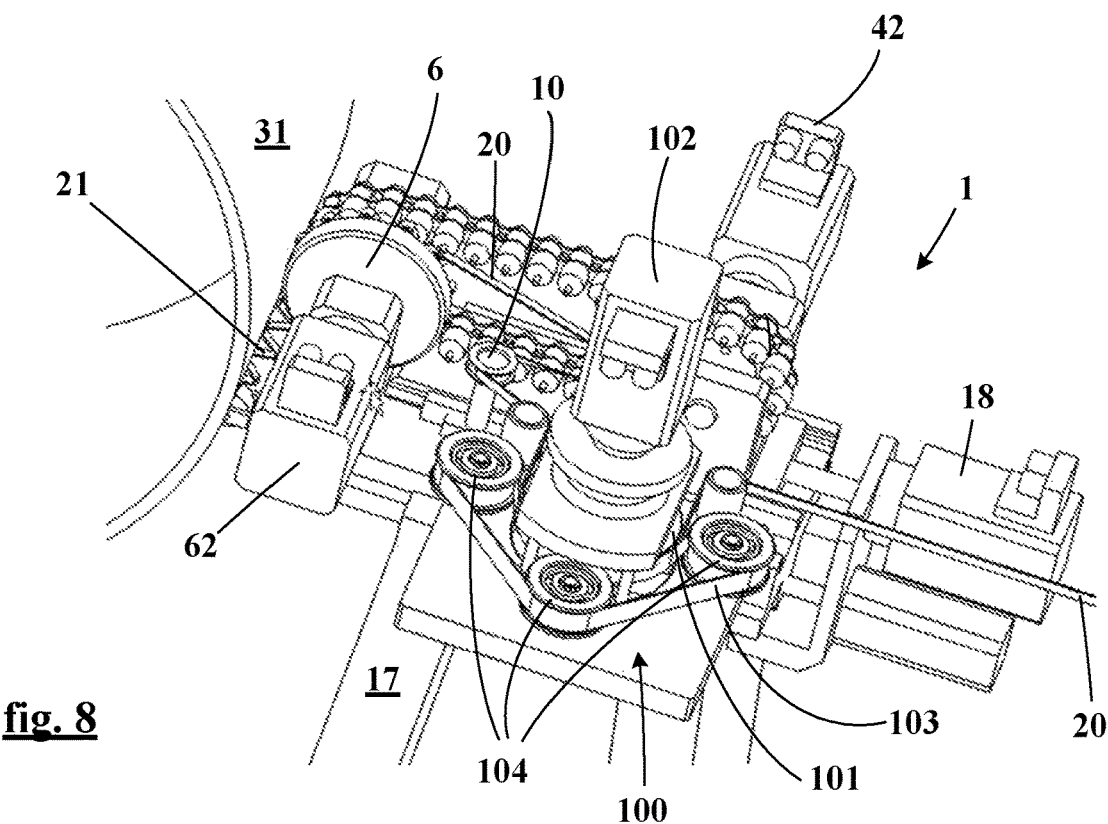
FIGS. 8 and 9 illustrate a perspective view and a top view of a preferred embodiment of the device according to the invention.
Figure 9:
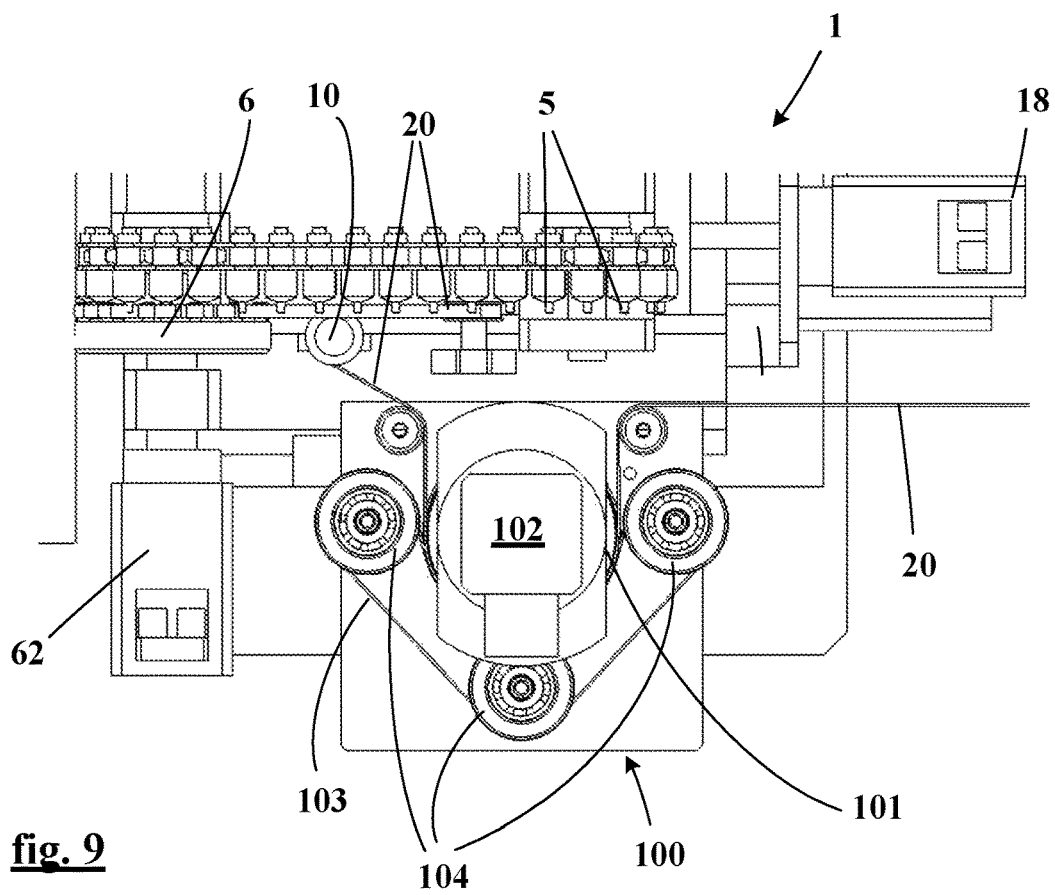

Preferably, the feeding of the device with the flat strip is subjected to precise control of its feeding rate. This can be obtained by virtue of the use of a motorized winch 100, as shown in FIGS. 8 and 9. These figures show the flat strip 20 being guided around the pulley 101 of the winch, the rotation of this pulley being controlled by the winch motor 102. Also preferably, a strap 103 stretched between returns 104 presses the strip against the winch pulley in order to prevent it from accidentally slipping. The speed of rotation of the winch, that is to say the speed of the flat plate feeding the device, can be controlled precisely depending on the speed of rotation of the receiving form in order to just as precisely control the overlength of the reinforcers laid, including in a dynamic manner during the helical winding of the undulating strip, as described above.

In order to adapt to the variations in lengths that are provided by the winch, the offset between the support plate axis AP and the axis of the intersecting sprocket can be adjusted passively by means for example of a simple spring that tends to return the slide 15, or actively by way of management based on a measurement of the effective tension of the strip.

The invention claimed is:

1. A device for preparing a reinforcing strip for a tire, to convert the strip from a flat form to an undulating form, the device comprising:

a continuous transporter structured to guide a plurality of fingers along a closed circuit that includes at least one rectilinear path portion, the fingers being structured to bear against a first face of the strip;

a rotary support plate that rotates about a support plate axis, the rotary support plate being structured to support a plurality of rotary rollers having axes parallel to the support plate axis, the rollers being distributed in a circle and the rollers being structured to bear against a second face of the strip;

a guide structured to guide the strip, when in the flat form, as the strip enters the device; and a synchronizer that synchronizes a rotation of the rotary support plate and a forward motion of the continuous transporter, wherein the closed circuit has an intersecting portion at which the synchronizer allows the fingers and the rollers to move in rotational movements in a common plane perpendicular to the support plate axis, the fingers and the rollers being interposed at the intersecting portion so as to cause the strip to have undulating form with waves that extend in the common plane, wherein the device further comprises a static strip diverter positioned at the intersecting portion, the static strip diverter being structured to divert the strip from the fingers, wherein the static strip diverter is structured to divert the strip at least a quarter turn after a starting portion of the intersecting portion, wherein the closed circuit includes a curved path portion at the intersecting portion, wherein an end of the static strip diverter is disposed between the curved path portion and a portion of a path of the plurality of rotary rollers.

2. The device according to claim 1, wherein the continuous transporter is a chain guided by an intersecting sprocket at the intersecting portion of the closed circuit.

3. The device according to claim 2, wherein the circle in which the rollers are distributed has a diameter greater than a diameter of the intersecting sprocket.

4. The device according to claim 2, wherein the fingers are carried by pins of links of the chain.

5. The device according to claim 1, wherein the guide includes pulleys that are structured to guide the strip towards the intersecting portion in a direction substantially in the common plane.

6. The device according to claim 1, wherein the continuous transporter and the rotary support plate are supported by a base that is structured to move with respect to a fixed structure.

7. The device according to claim 6, further comprising a stitcher arranged to stitch the strip in the undulating form, wherein the stitcher is attached to the base.

8. The device according to claim 7, wherein the stitcher comprises a pressing roller pushed by a pneumatic cylinder.

9. The device according to claim 1, further comprising a stitcher arranged to stitch the strip in the undulating form.

10. The device according to claim 1, further comprising a winch arranged to control a supplying operation of the strip in the flat form.

11. The device according to claim 1, wherein the rollers are distributed in a circle substantially concentric with the support plate axis.

12. An installation for manufacturing a tire, the installation comprising:

(1) a device for preparing a reinforcing strip for the tire, to convert the strip from a flat form to an undulating form, the device including: (a) a continuous transporter structured to guide a plurality of fingers along a closed circuit that includes at least one rectilinear path portion, the fingers being structured to bear against a first face of the strip, (b) a rotary support plate that rotates about a support plate axis, the rotary support plate being structured to support a plurality of rotary rollers having axes parallel to the support plate axis, the rollers being distributed in a circle, and the rollers being structured to bear against a second face of the strip, (c) a guide structured to guide the strip, when in the flat form, as the strip enters the device, and (d) a synchronizer that synchronizes a rotation of the rotary support plate and a forward motion of the continuous transporter, wherein the closed circuit has an intersecting portion at which the synchronizer allows the fingers and the rollers to move in rotational movements in a common plane perpendicular to the support plate axis, the fingers and the rollers being interposed at the intersecting portion so as to cause the strip to have the undulating form with waves that extend in the common plane; and (2) a rotary structure arranged to receive the strip in the undulating form, the rotary structure being positioned to face the intersecting portion to allow peaks of the waves of the strip to adhere to a surface of the rotary structure so that the strip is transferred onto the rotary structure, wherein the device further comprises a static strip diverter positioned at the intersecting portion, the static strip diverter being structured to divert the strip from the fingers, wherein the static strip diverter is structured to divert the strip at least a quarter turn after a starting portion of the intersecting portion, wherein the closed circuit includes a curved path portion at the intersecting portion, wherein an end of the static strip diverter is disposed between the curved path portion and a portion of a path of the plurality of rotary rollers.

13. A method for preparing a reinforcement used to manufacture a tire, the method comprising a step of supplying a reinforcing strip to an installation that includes:

(1) a device that converts the strip from a flat form to an undulating form, the device including: (a) a continuous transporter structured to guide a plurality of fingers along a closed circuit that includes at least one rectilinear path portion, the fingers being structured to bear against a first face of the strip, (b) a rotary support plate that rotates about a support plate axis, the rotary support plate being structured to support a plurality of rotary rollers having axes parallel to the support plate axis, the rollers being distributed in a circle, and the rollers being structured to bear against a second face of the strip, (c) a guide structured to guide the strip, when in the flat form, as the strip enters the device, and (d) a synchronizer that synchronizes a rotation of the rotary support plate and a forward motion of the continuous transporter, wherein the closed circuit has an intersecting portion at which the synchronizer allows the fingers and the rollers to move in rotational movements in a common plane perpendicular to the support plate axis, the fingers and the rollers being interposed at the intersecting portion so as to cause the strip to have the undulating form with waves extending in the common plane; and (2) a rotary structure arranged to receive the strip in the undulating form, the rotary structure being positioned to face the intersecting portion to allow peaks of the waves of the strip to adhere to a surface of the rotary structure so that the strip is transferred onto the rotary structure, wherein the device further comprises a static strip diverter positioned at the intersecting portion, the static strip diverter being structured to divert the strip from the fingers, wherein the static strip diverter is structured to divert the strip at least a quarter turn after a starting portion of the intersecting portion, wherein the closed circuit includes a curved path portion at the intersecting portion, wherein an end of the static strip diverter is disposed between the curved path portion and a portion of a path of the plurality of rotary rollers.

14. The method according to claim 13, wherein the rotary structure includes a green tire blank supported by a drum.

15. The method according to claim 14, further comprising a step of winding a plurality of turns of the strip in the undulating form onto the green tire blank in a helix, with the waves of the strip extending in a plane substantially parallel to an equatorial plane of the green tire blank.

16. The method according to claim 15, wherein a height of the waves of the strip is varied during the winding step.

17. The method according to claim 14, further comprising a step of folding down the waves of the strip against the green tire blank using a stitcher.

* * * * *